(12) United States Patent
Wakayama (10) Patent No.: US 6,830,527 B2
(45) Date of Patent: Dec. 14, 2004

(54) COOLING SYSTEM FOR WORKING FLUID USED IN AUTOMATIC TRANSMISSION OF AUTOMOTIVE VEHICLE

(75) Inventor: Hideshi Wakayama, Kanagawa (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 10/833,052

(22) Filed: Apr. 28, 2004

(65) Prior Publication Data

US 2004/0204281 A1 Oct. 14, 2004

Related U.S. Application Data

(62) Division of application No. 10/033,904, filed on Jan. 3, 2002, now Pat. No. 6,740,000.

(30) Foreign Application Priority Data

Mar. 9, 2001 (JP) ........................................ 2001-067029

(51) Int. Cl.[7] .............................................. F16H 57/04
(52) U.S. Cl. ........................ 475/161; 165/916; 165/140; 137/599.14; 74/467; 74/606 A
(58) Field of Search ................................. 475/161, 159; 165/283, 297, 140, 916, 280; 184/6.21, 6.22, 104.1, 104.2, 104.3; 137/599.14; 74/467, 606 A (56) References Cited

U.S. PATENT DOCUMENTS

| | | | |
|---|---|---|---|
| 2,517,812 A | 8/1950 | Wade | |
| 2,540,629 A | 2/1951 | Miller | |
| 3,874,183 A | 4/1975 | Tabet | |
| 4,063,431 A | 12/1977 | Dankowski | |
| 4,566,530 A | 1/1986 | Gooden | |
| 4,637,454 A | 1/1987 | Lowes | |
| 5,217,085 A | 6/1993 | Barrie et al. | |
| 5,666,807 A | 9/1997 | Bianchetta | |
| 5,894,834 A * | 4/1999 | Kim | 123/552 |
| 5,904,292 A | 5/1999 | McIntosh | |
| 5,946,911 A * | 9/1999 | Buschur et al. | 60/424 |
| 6,053,131 A | 4/2000 | Mueller et al. | |
| 6,178,928 B1 * | 1/2001 | Corriveau | 123/41.12 |
| 6,244,385 B1 | 6/2001 | Tsubata et al. | |
| 6,383,672 B1 * | 5/2002 | Fujita | 429/26 |

FOREIGN PATENT DOCUMENTS

| | | |
|---|---|---|
| DE | 34 03 435 A1 | 8/1984 |
| JP | 11-264318 A | 9/1999 |
| JP | 2000-46156 A | 2/2000 |

* cited by examiner

Primary Examiner—Saul Rodriguez
Assistant Examiner—David D. Le
(74) Attorney, Agent, or Firm—Foley & Lardner LLP (57) ABSTRACT

In a transmission-fluid cooling system of an automatic transmission of an automotive vehicle equipped with a water-cooled oil cooler and an air-cooled oil cooler connected in series to each other, a first bypass valve is provided to permit working fluid to circulate therevia through oil passages in the transmission, bypassing the water-cooled oil cooler and the air-cooled oil cooler, only when a working-fluid temperature is less than or equal to a predetermined temperature and the line pressure is greater than or equal to a predetermined pressure. Also provided is a second bypass valve that opens to permit the working fluid to circulate via the water-cooled oil cooler and the second bypass valve through the oil passages in the transmission, bypassing only the air-cooled oil cooler, only when the working-fluid temperature is less than or equal to a preset temperature value.

4 Claims, 5 Drawing Sheets

COOLING SYSTEM FOR WORKING FLUID USED IN AUTOMATIC TRANSMISSION OF AUTOMOTIVE VEHICLE

The present application is a divisional of U.S. application Ser. No. 10/033,904, filed Jan. 3, 2002, now U.S. Pat. No. 6,740,000 the entire contents of which are incorporated herein by reference.

TECHNICAL FIELD

The present invention relates to a transmission fluid cooling system for an automotive vehicle, and specifically to a transmission-fluid cooling system equipped with both a water-cooled oil cooler and an air-cooled oil cooler connected in series to each other and capable of cooling working fluid circulating through a transmission oil pump, a hydraulic control circuit, and a lubrication circuit in the transmission.

BACKGROUND ART

Figure 4:
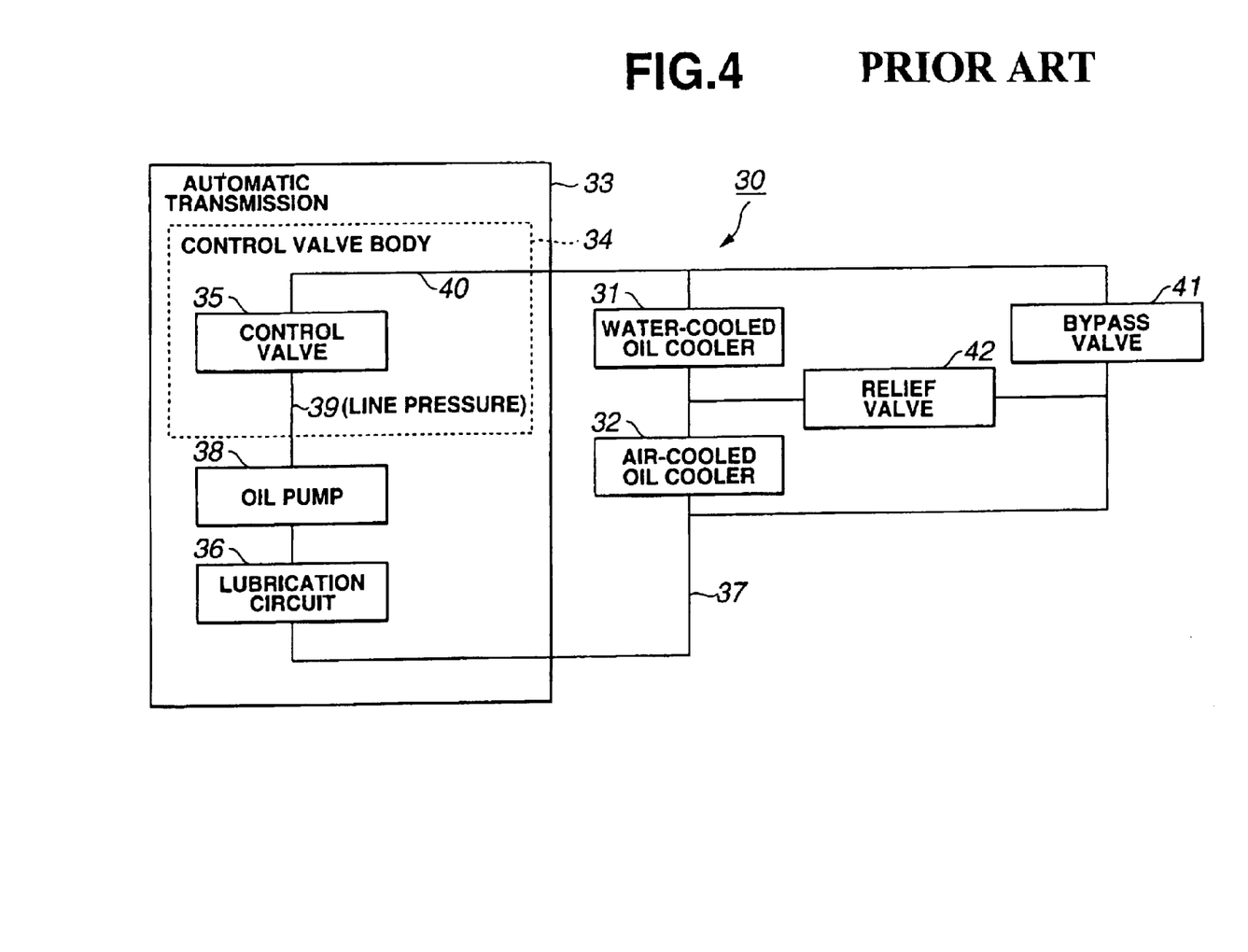
FIG. 4 is the system block diagram illustrating a certain transmission-fluid cooling system.

As shown in FIG. 4, a transmission fluid cooling system 30 often uses both a water-cooled oil cooler 31 and an air-cooled oil cooler 32 fluidly connected in series to each other, for enhanced cooling performance. Water-cooled oil cooler 31 serves to remove heat from working fluid by the forced circulation of engine coolant. Air-cooled oil cooler 32 serves to cool the working fluid by close contact with a large volume of outside air. Oil coolers 31 and 32 are fluidly connected to a control valve 35 and a lubrication circuit 36 in an automatic transmission 33 via a hydraulic line 37. Control valve 35 is incorporated in a control valve body 34 included in a hydraulic control circuit laid out in an automatic transmission 33. An oil pump 38 is provided to pressurize and send working fluid through its outlet port into the hydraulic line. The working fluid discharged from oil pump 38 circulates through control valve 35, water-cooled oil cooler 31, air-cooled oil cooler 32, and lubrication circuit 36, in that order (see FIG. 4). The working-fluid pressure produced by oil pump 38 is called "line pressure". In other words, the line pressure is created on the working fluid in a connection line 39 between the inlet port of control valve 35 and the outlet port of oil pump 38. A hydraulic pressure substantially proportional to and less than the line pressure is created on the working fluid in a hydraulic line 40 leading from the outlet port of control valve 35 to water-cooled oil cooler 31. Transmission fluid cooling system 30 also includes a bypass valve 41 and a relief valve 42. Bypass valve 41 is constructed as an oil-temperature sensing element equipped bypass valve. The oil-temperature sensing element incorporated in bypass valve 41 is able to sense a working-fluid temperature. When a temperature value of the working-fluid temperature detected by the oil-temperature sensing element of bypass valve 41 is low, bypass valve 41 fully opens to permit the working fluid to circulate via the bypass valve through the oil passages in automatic transmission 33, bypassing both the water-cooled oil cooler 31 and air-cooled oil cooler 32. This enhances the engine warm-up performance and prevents overcooling of the working fluid. Pressure relief valve 42 is provided to prevent an excessive rise in the line pressure. When the line pressure exceeds a set pressure level of relief valve 42, the relief valve fully opens to permit the working fluid to circulate via water-cooled oil cooler 31 and relief valve 42 through the oil passages in automatic transmission 33, bypassing only the air-cooled oil cooler 32.

Figure 5:
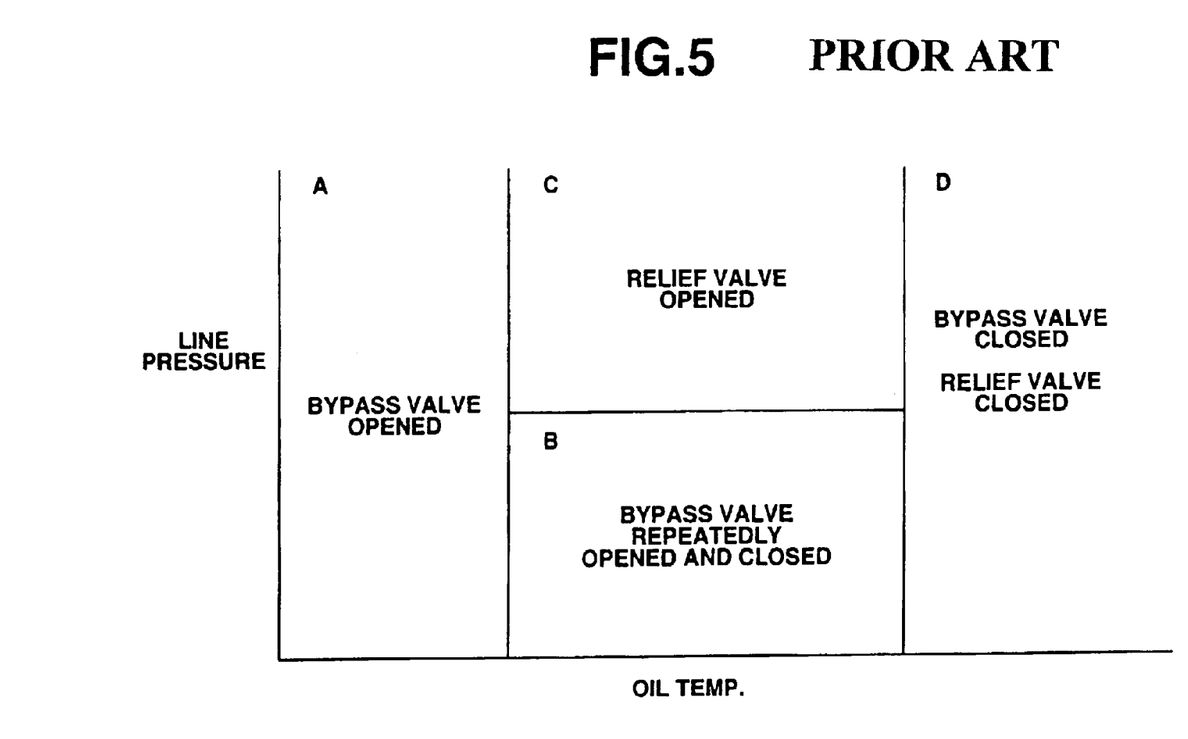
FIG. 5 is the diagram of operating characteristics of the bypass valve and relief valve incorporated in the transmission-fluid cooling system shown in FIG. 4, for line pressure and working-fluid temperature.

Referring now to FIG. 5, there is shown a diagram of opening and closing characteristics of bypass valve 41 and relief valve 42 for line pressure and working-fluid temperature. As can be seen from the characteristic diagram of FIG. 5, in the transmission fluid cooling system 30 of FIG. 4, there are four control mode areas A, B, C, and D. In the first control mode area A that the engine is cold and thus the working-fluid temperature is very low, bypass valve 41 opens in response to the temperature sensed by the oil-temperature sensing element built in bypass valve 41, and therefore the working fluid is permitted to flow via bypass valve 41 through the oil passages in automatic transmission 33, bypassing two oil coolers 31 and 32. In the area B that the working-fluid temperature rises to a certain extent while the line pressure does not yet reach a predetermined pressure level, bypass valve 41 is repeatedly opened and closed depending upon a temperature rise/fall of working-fluid temperature. In the area C that the working-fluid temperature rises to a certain extent while the line pressure exceeds the predetermined pressure level, relief valve 42 opens due to the line pressure above the predetermined pressure level. Thus, in the area C, the working fluid is permitted to flow via water-cooled oil cooler 31 and relief valve 42 through the oil passages in automatic transmission 33, bypassing only the air-cooled oil cooler 32. In the area D that the working-fluid temperature exceeds a preset temperature value, for example when the engine has been warmed up and approaches operating temperature, bypass valve 41 and relief valve 42 are both closed to permit working-fluid flow flowing through both the water-cooled oil cooler 31 and air-cooled oil cooler 32 so as to increase the cooling action. One such transmission-fluid cooling system has been disclosed in Japanese Patent Provisional Publication No. 2000-46156.

SUMMARY OF THE INVENTION

In the transmission fluid cooling system 30 as shown in FIGS. 4 and 5, there are some drawbacks. First, in the low working-fluid temperature area A of FIG. 5, bypass valve 41 fully opens regardless of the magnitude of line pressure. In this case, there is no flow through water-cooled oil cooler 31, in other words, the working fluid cannot be rapidly warmed by way of engine-coolant circulation. A viscosity of working fluid supplied to moving transmission parts (for example clutch plates, transmission input shaft, planetary-gear system, and various bushings and bearings) for lubrication tends to be high. This increases fuel consumption.

Second, in the medium working-fluid temperature, low line-pressure area B of FIG. 5, assuming that the working-fluid temperature is above the preset temperature value but not sufficiently high, bypass valve 41 closes to permit working-fluid flow through both the water-cooled oil cooler 31 and air-cooled oil cooler 32. In this case, owing to a comparatively high viscous resistance (in particular, a higher viscous resistance of working fluid flowing through air-cooled oil cooler 32) and low line pressure, and thereby prevents adequate working-fluid supply into the oil passages. This results in re-cooling of the working fluid.

Third, in the transmission fluid cooling system 30 as shown in FIGS. 4 and 5, bypass valve 41 is located outside of the control valve 35 of control valve body 34. Thus, a bypass oil passage tends to be lengthened and complicated. In such a case, apart of the oil passages is exposed to the outside air. If the outside air temperature is low, there is an increased tendency for the fluid-flow resistance of working fluid flowing through the oil passages to increase. Due to the increased fluid-flow resistance, it is impossible to attain adequate working-fluid supply needed for good lubrication.

Accordingly, it is an object of the invention to provide a cooling system for working fluid used in an automatic transmission of an automotive vehicle, which avoids the aforementioned disadvantages.

It is another object of the invention to provide a cooling system for working fluid used in an automatic transmission of an automotive vehicle equipped with a water-cooled oil cooler and an air-cooled oil cooler connected in series to each other, which ensures optimal switching between operative and inoperative modes of each of the water-cooled oil cooler and air-cooled oil cooler depending upon the magnitude of line pressure as well as working-fluid temperature, when the working-fluid temperature is low.

It is a further object of the invention to provide a cooling system for working fluid used in an automatic transmission of an automotive vehicle equipped with a water-cooled oil cooler and an air-cooled oil cooler connected in series to each other, which permits an operative mode of the water-cooled oil cooler and an inoperative mode of the air-cooled oil cooler when the working-fluid temperature is low and the magnitude of line pressure is low, and when the working-fluid temperature is medium.

It is a still further object of the invention to provide a cooling system for working fluid used in an automatic transmission of an automotive vehicle equipped with a water-cooled oil cooler and an air-cooled oil cooler connected in series to each other, which permits operative modes of both the water-cooled oil cooler and air-cooled oil cooler when the working-fluid temperature is high.

It is another object of the invention to provide a simple cooling system for working fluid used in an automatic transmission of an automotive vehicle equipped with a water-cooled oil cooler and an air-cooled oil cooler connected in series to each other, in which a bypass circuit containing a bypass valve associated with both the water-cooled oil cooler and air-cooled oil cooler is unaffected by the outside air temperature and additionally the bypass circuit is compactly constructed while minimizing the entire length of the bypass circuit.

In order to accomplish the aforementioned and other objects of the present invention, a cooling system for working fluid used in an automatic transmission of an automotive vehicle, comprises a water-cooled oil cooler and an air-cooled oil cooler connected in series to each other and both disposed in an oil cooler line for cooling the working fluid, an oil pump located in the automatic transmission and disposed in the oil cooler line for pressurizing and sending the working fluid into the oil cooler line, a hydraulic control circuit disposed downstream of the oil pump for regulating a line pressure produced by the oil pump, a lubrication circuit located in the automatic transmission for lubrication of moving transmission parts, a first bypass valve that opens to permit the working fluid to circulate via the first bypass valve through the oil pump, the hydraulic control circuit and the lubrication circuit, bypassing the water-cooled oil cooler and the air-cooled oil cooler, only when a working-fluid temperature is less than or equal to a predetermined temperature and the line pressure is greater than or equal to a predetermined pressure, and a second bypass valve that opens to permit the working fluid to circulate via the water-cooled oil cooler and the second bypass valve through the oil pump, the hydraulic control circuit and the lubrication circuit, bypassing only the air-cooled oil cooler, only when the working-fluid temperature is less than or equal to a preset temperature value.

According to another aspect of the invention, a cooling system for working fluid used in an automatic transmission of an automotive vehicle, comprises a water-cooled oil cooler and an air-cooled oil cooler connected in series to each other and both disposed in an oil cooler line for cooling the working fluid, an oil pump located in the automatic transmission and disposed in the oil cooler line for pressurizing and sending the working fluid into the oil cooler line, a hydraulic control circuit disposed downstream of the oil pump for regulating a line pressure produced by the oil pump, a lubrication circuit located in the automatic transmission for lubrication of moving transmission parts, a first bypass valve that opens in response to a working-fluid temperature as well as the line pressure, to permit the working fluid to circulate via the first bypass valve through the oil pump, the hydraulic control circuit and the lubrication circuit, bypassing the water-cooled oil cooler and the air-cooled oil cooler, and the first bypass valve being located within a control valve body included in the hydraulic control circuit.

According to a further aspect of the invention, a cooling system for working fluid used in an automatic transmission of an automotive vehicle, comprises a water-cooled oil cooler and an air-cooled oil cooler connected in series to each other and both disposed in an oil cooler line for cooling the working fluid, an oil pump located in the automatic transmission and disposed in the oil cooler line for pressurizing and sending the working fluid into the oil cooler line, a hydraulic control circuit disposed downstream of the oil pump for regulating a line pressure produced by the oil pump, a lubrication circuit located in the automatic transmission for lubrication of moving transmission parts, a first bypass valve that opens to permit the working fluid to circulate via the first bypass valve through the oil pump, the hydraulic control circuit and the lubrication circuit, bypassing the water-cooled oil cooler and the air-cooled oil cooler, only when a hydraulic pressure created on the working fluid in a portion of the oil cooler line leading from an outlet of the hydraulic control circuit to an upstream side of the water-cooled oil cooler and the air-cooled oil cooler exceeds a preset pressure level, and a second bypass valve that opens to permit the working fluid to circulate via the water-cooled oil cooler and the second bypass valve through the oil pump, the hydraulic control circuit and the lubrication circuit, bypassing only the air-cooled oil cooler, only when a working-fluid temperature is less than or equal to a preset temperature value.

According to a still further aspect of the invention, a cooling system for working fluid used in an automatic transmission of an automotive vehicle, comprises a water-cooled oil cooler and an air-cooled oil cooler connected in series to each other and both disposed in an oil cooler line for cooling the working fluid, an oil pump located in the automatic transmission and disposed in the oil cooler line for pressurizing and sending the working fluid into the oil cooler line, a hydraulic control circuit disposed downstream of the oil pump for regulating a line pressure produced by the oil pump, a lubrication circuit located in the automatic transmission for lubrication of moving transmission parts, a temperature sensor that detects a working-fluid temperature, a first bypass valve that permits the working fluid to circulate via the first bypass valve through the oil pump, the hydraulic control circuit and the lubrication circuit, bypassing the water-cooled oil cooler and the air-cooled oil cooler, a second bypass valve that permits the working fluid to circulate via the water-cooled oil cooler and the second bypass valve through the oil pump, the hydraulic control circuit and the lubrication circuit, bypassing only the air-cooled oil cooler, and a control unit configured to be connected electronically to the temperature sensor, and the first and second bypass valves, for automatically controlling opening and closing operations of each of the first and second bypass valves depending on the line pressure as well as the working-fluid temperature and for controlling the line pressure depending on a sensor signal from the temperature sensor, the control unit comprising a first bypass valve control section keeping the first bypass valve opened in a first control mode area that the working-fluid temperature is low and the line pressure is high, and a second bypass valve control section keeping the second bypass valve closed in a second control mode area that the working-fluid temperature is high.

The other objects and features of this invention will become understood from the following description with reference to the accompanying drawings.

DESCRIPTION OF THE PREFERRED EMBODIMENTS

Figure 1:
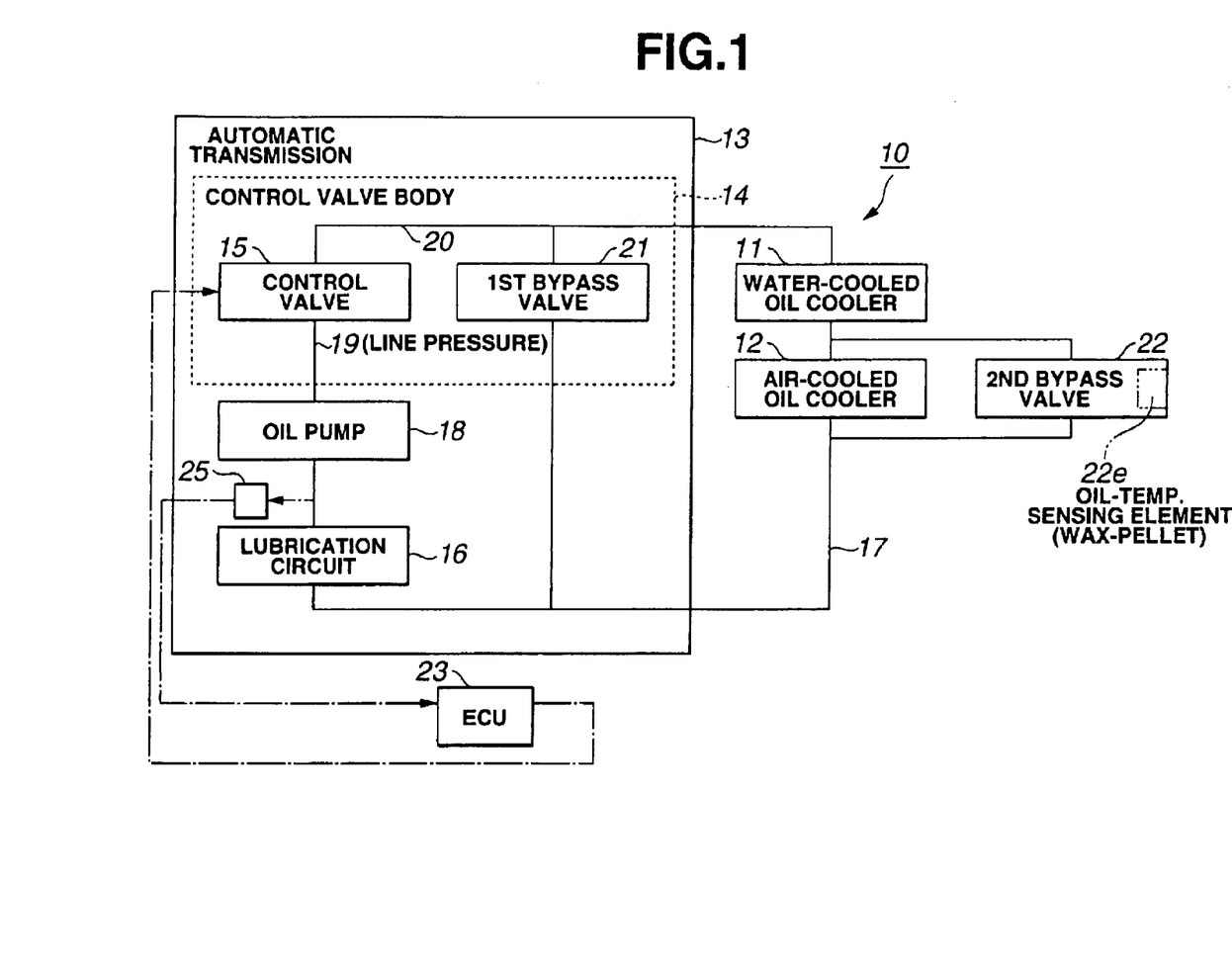
FIG. 1 is a system block diagram illustrating a first embodiment of a transmission-fluid cooling system of an automotive vehicle equipped with both a water-cooled oil cooler and an air-cooled oil cooler.

Referring now to the drawings, particularly to FIG. 1, there is shown the block diagram of a transmission-fluid cooling system 10 of the first embodiment. Transmission-fluid cooling system 10 includes a water-cooled oil cooler 11 and an air-cooled oil cooler 12 connected in series to each other. Water-cooled oil cooler 11 functions to remove heat from working fluid (transmission fluid) by the forced circulation of engine coolant. Air-cooled oil cooler 12 functions to cool the working fluid by way of close contact with a large volume of outside air (cool air). Water-cooled oil cooler 11 and air-cooled oil cooler 12 are fluidly connected to a control valve 15 and a lubrication circuit 16 in an automatic transmission 13 via a hydraulic line or an oil cooler line 17. Control valve 15 is incorporated in a control valve body 14 included in a hydraulic control circuit laid out in an automatic transmission 13. An oil pump 18 is provided to pressurize and send working fluid through its outlet port into the hydraulic line for forced circulation of the working fluid. The working fluid discharged from oil pump 18 circulates through control valve 15, water-cooled oil cooler 11, air-cooled oil cooler 12, and lubrication circuit 16, in that order (see FIG. 1). Line pressure in a hydraulic line 19 (disposed between oil pump 18 and control valve 15) is produced by oil pump 18 and regulated by means of control valve 15 of the hydraulic control circuit to produce a regulated line pressure. Control valve 15 is driven in response to a command signal from an electronic control unit (ECU) 23, which will be fully described later. Therefore, the line pressure is regulated responsively to the command signal from ECU 23, so that an actual line pressure is brought close to a desired value. Actually, the line pressure in hydraulic line 19 is controlled or regulated depending on an oil temperature detected by means of an oil temperature sensor 25 or an oil temperature sensor 22t (described later). A line denoted by reference sign 20 is a hydraulic line (a portion of oil cooler line 17) leading from an outlet port of control valve 15 to an upstream side (water-cooled oil cooler) of water-cooler oil cooler 11 and air-cooled oil cooler 12. The hydraulic pressure in hydraulic line 20 is substantially proportional to and less than the line pressure. Transmission fluid cooling system 10 also includes a first bypass valve 21 and a second bypass valve 22. First bypass valve 21 is disposed in control valve body 14. First bypass valve 21 operates in response to the hydraulic pressure in hydraulic line 2C. Note that the hydraulic pressure in hydraulic line 20 is different from the line pressure (the hydraulic pressure in hydraulic line 19) itself. As will be hereinafter described in detail, the hydraulic pressure in hydraulic line 20 varies depending on the working-fluid temperature as well as the line pressure. The line pressure in hydraulic line 19 is generally estimated from the signal value of the command signal from ECU 23. The signal value of the command signal from ECU 23 is based on the temperature value of oil temperature detected by oil temperature sensor 25 (or oil temperature sensor 22t). As shown in FIG. 1, for oil-temperature measurement, oil temperature sensor 25 is screwed or located in a hydraulic line disposed between lubrication circuit 16 and oil pump 18. The sensor signal from oil temperature sensor 25 is sent to the input interface of ECU 23. The line pressure is properly controlled by means of ECU 23, taking into account a viscosity of the working fluid correlated to the oil temperature detected by oil temperature sensor 25. In lieu of estimation of the line pressure from the command signal value of ECU 23, the line pressure may be detected or sensed directly by means of a pressure sensor (not shown) located in hydraulic line 19.

When the hydraulic pressure in hydraulic line 20 exceeds a preset pressure level, first bypass valve 21 fully opens to permit the working fluid to circulate via the first bypass valve through the oil passages in automatic transmission 13, bypassing both the water-cooled oil cooler 11 and air-cooled oil cooler 12. In the transmission-fluid cooling system of the first embodiment of FIG. 1, first bypass valve 21 (constructed by the pressure relief valve) is located compactly within control valve body 14. Thus, the entire length of oil cooler line 17 can be minimized or shortened, and the structure of the oil cooler line or the oil cooler hydraulic circuit is simple. Furthermore, the working fluid flowing through first bypass valve 21 cannot be exposed directly to the outside air. This reduces the fluid-flow resistance of working fluid flowing through the oil passages, and enhances a lubricating effect, thus ensuring improved fuel economy.

In contrast, second bypass valve 22 is provided outside of automatic transmission 13. Second bypass valve 22 is opened to permit the working fluid to circulate via water-cooled oil cooler 11 and second bypass valve 22 through the oil passages in automatic transmission 13, bypassing only the air-cooled oil cooler 12. Concretely, only when the oil temperature exceeds a preset temperature value, second bypass valve 22 is closed (as fully described later in reference to the characteristic diagram of FIG. 2). In the system of the first embodiment, first bypass valve is comprised of a pressure relief valve whose set pressure is the aforementioned predetermined pressure level for the hydraulic pressure in hydraulic line 20. On the other hand, second bypass valve 22 is comprised of an oil-temperature sensitive bypass valve such as a wax-pellet type bypass valve that is closed by a wax pellet expandable with increasing working-fluid temperature. The wax pellet serves as an oil-temperature sensing element 22e (see FIG. 1). Oil-temperature sensing element 22e built in second bypass valve 22 is able to sense a temperature of working fluid flowing through second bypass valve 22.

Figure 2:
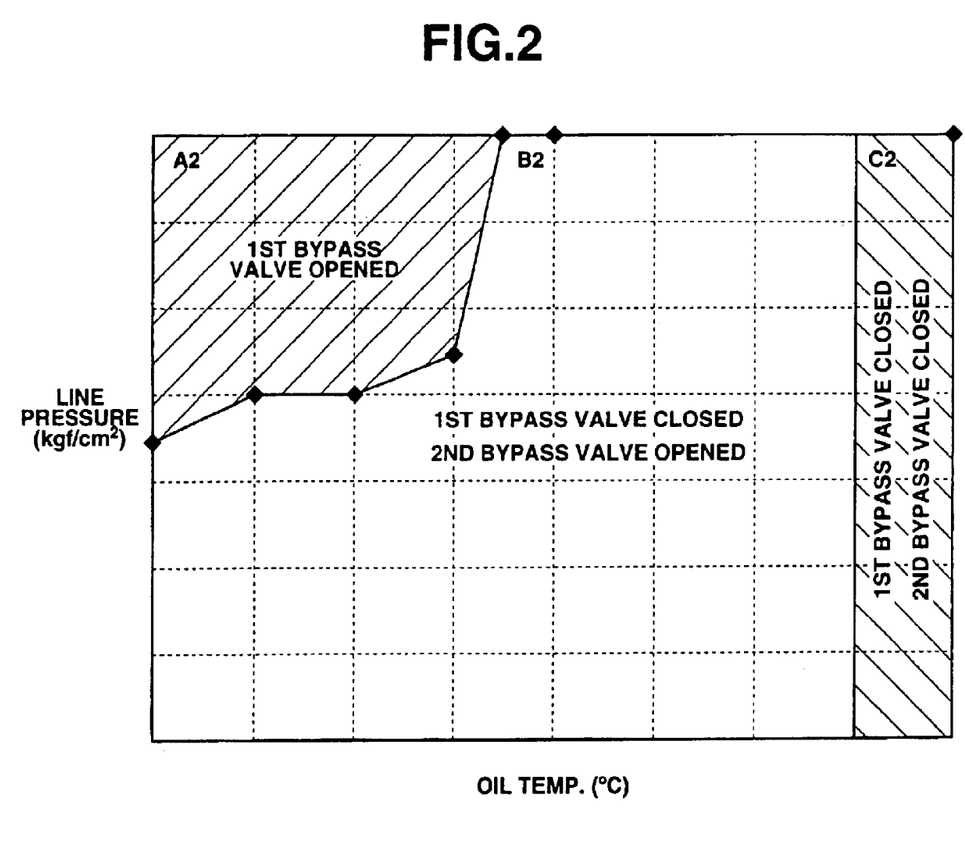
FIG. 2 is a diagram of operating characteristics of first and second bypass valves incorporated in the cooling system of the embodiment shown in FIG. 1, for line pressure and working-fluid temperature.
Figure 3:
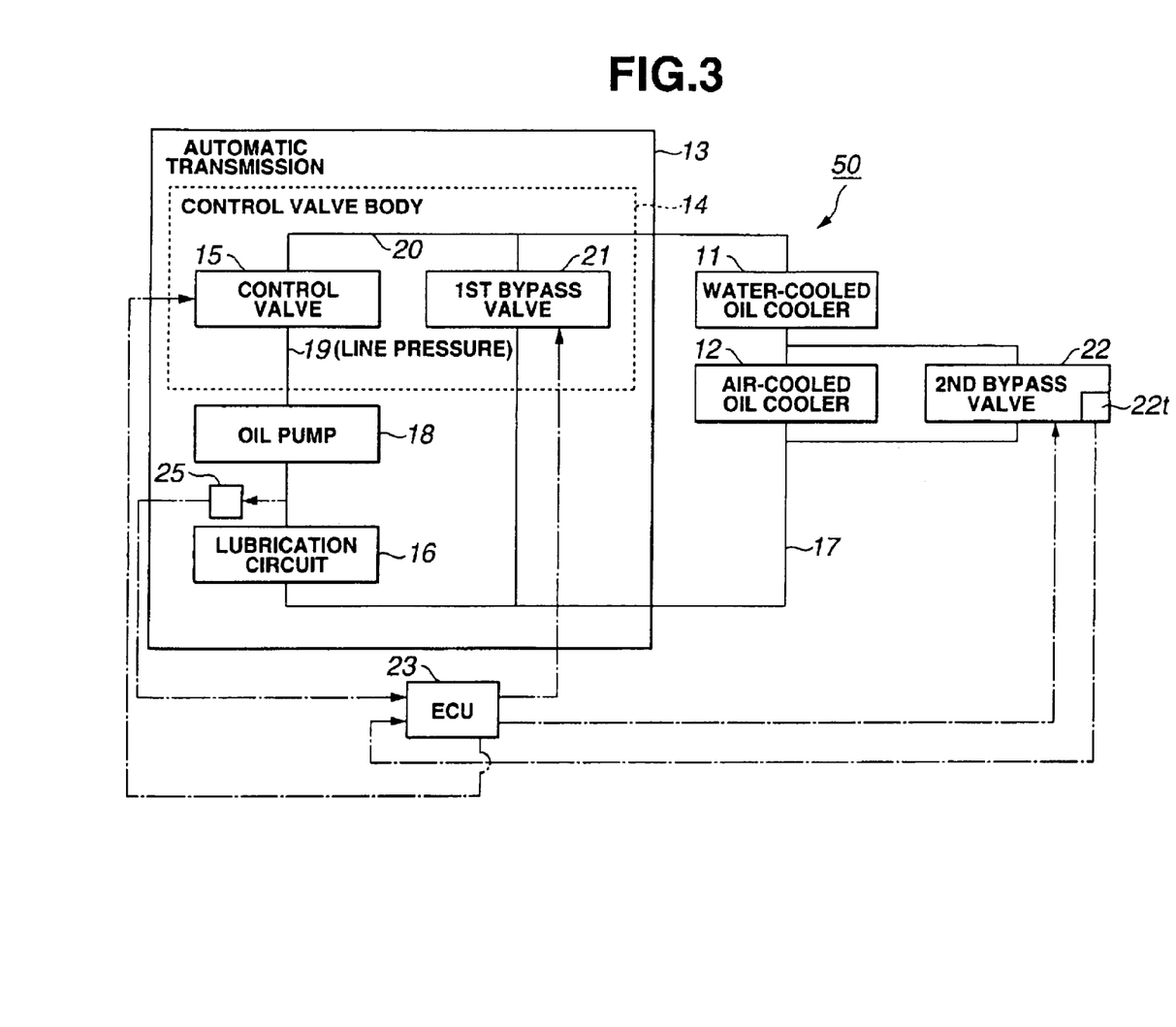
FIG. 3 is a system block diagram illustrating a second embodiment of a transmission-fluid cooling system of an automotive vehicle equipped with both a water-cooled oil cooler and an air-cooled oil cooler.

Referring now to FIG. 3, there is shown the block diagram of a transmission-fluid cooling system 50 of the second embodiment. The cooling system 50 of the second embodiment of FIG. 3 is slightly different from the cooling system 10 of the first embodiment of FIG. 1, in that in the second embodiment electronically-controlled electromagnetic solenoid valves are used as first and second bypass valves 21 and 22. As will be described in detail in reference to FIG. 2, the operation and effects of the system of the second embodiment of FIG. 3 and those of the system of the first embodiment of FIG. 1 are the same. The same reference signs used to designate elements in the system of the first embodiment shown in FIG. 1 will be applied to the corresponding elements used in the system of the second embodiment shown in FIG. 3, for the purpose of comparison of the first and second embodiments. First and second bypass valves 21 and 22 constructed by the electromagnetic solenoid valves and an oil temperature sensor 22t built in the second bypass valve will be hereinafter described in detail with reference to the accompanying drawings, while detailed description of the other elements will be omitted because the above description thereon seems to be self-explanatory.

In the cooling system 50 of the second embodiment, first bypass valve 21 is comprised of an electromagnetic solenoid valve, which is electromagnetically operated in response to a control signal (a solenoid drive signal) from ECU 23. The magnitude of the solenoid drive signal is dependent upon the line pressure estimated by the command signal from the output interface of ECU 23 and corresponding to the desired line pressure computed based on the oil temperature detected. In the same manner as the system 10 of the first embodiment of FIG. 1, in the cooling system 50 of the second embodiment of FIG. 3, first bypass valve 21 (constructed by the electromagnetic solenoid valve) is located compactly within control valve body 14, whereas second bypass valve 22 is provided outside of automatic transmission 13. Second bypass valve 22 is comprised of an electromagnetic solenoid valve, which is electromagnetically operated in response to a control signal (a solenoid drive signal) from ECU 23. The magnitude of the solenoid drive signal is dependent upon the working-fluid temperature detected by an oil temperature sensor 22t built in second bypass valve 22 or an oil temperature sensor 25. The oil-temperature sensor signal from temperature sensor 22t built in second bypass valve 22 and the sensor signal from temperature sensor 25 is sent to the input interface of ECU 23. Note that there is an operating range within which no working fluid (transmission fluid) is supplied to second bypass valve 22. In case of no working-fluid supply to second bypass valve 22, it is impossible to precisely measure or detect the oil temperature by means of oil temperature sensor 22t built in second bypass valve 22. The aforementioned oil temperature sensor 25 serves as an auxiliary oil temperature sensor during no working-fluid supply to second bypass valve 22.

Details of ECU 23 are hereunder described in reference to FIGS. 1 and 3.

ECU 23 (bypass valve controller) generally comprises a microcomputer. ECU includes an input/output interface (I/O), memories (RAM, ROM), and a microprocessor or a central processing unit (CPU). The input/output interface (I/O) of ECU 23 receives input information from various engine/vehicle sensors, (oil-temperature sensor 25 in the first embodiment or oil-temperature sensor 22t built in second bypass valve 22 and auxiliary oil-temperature sensor 25 in the second embodiment). Within ECU 23, the central processing unit (CPU) allows the access by the I/O interface of input informational data signals from the previously-discussed engine/vehicle sensors. In the cooling system 10 of the first embodiment of FIG. 1, the CPU of ECU 23 is responsible for carrying the line pressure control program stored in memories and is capable of performing necessary arithmetic and logic operations containing a control management processing for control valve 15. A computational result, that is, a calculated output signal is relayed via the output interface circuitry of ECU 23 to an output stage, for example an electromagnetic spool valve constructing part of control valve 15. The control-valve control processing is executed within the CPU of ECU 23, based on the oil temperature detected by temperature sensor 25.

Alternatively, in the cooling system 50 of the second embodiment of FIG. 3, in addition to the previously-discussed line pressure control program based on the oil temperature, the CPU of ECU 23 is responsible for carrying the first bypass valve control/second bypass valve control program stored in memories and is capable of performing necessary arithmetic and logic operations containing a transmission-fluid temperature control management processing (containing an electronic first bypass valve opening and closing control and an electronic second bypass valve opening and closing control, both achieved through the transmission-fluid cooling system of the second embodiment. Computational results (arithmetic calculation results), that is, calculated output signals (solenoid drive currents) are relayed via the output interface circuitry of ECU 23 to output stages, namely electromagnetic solenoids constructing part of first bypass valve 21 and part of second bypass valve 22. The transmission-fluid temperature control management processing is executed within the CPU of ECU 23, based on the sensor signal from oil-temperature sensor 22t and/or the sensor signal from oil-temperature sensor 25, retrieving the characteristic map of FIG. 2. In the system of the second embodiment of FIG. 3, first and second bypass valves 21 and 22 are electronically controlled by means of ECU 23, based on both the line pressure (exactly, the line pressure estimated by the command signal from the output interface of ECU 23 and corresponding to the desired line pressure computed based on the oil temperature detected) and the working-fluid temperature.

Hereunder described by reference to the operating characteristics of first and second bypass valves 21 and 22, shown in FIG. 2 are details of the transmission-fluid temperature control management executed by the system 50 of the second embodiment of FIG. 3 and details of the transmission-fluid temperature adjustment of the system 10 of the first embodiment performed mechanically by using a pressure relief valve as the first bypass valve and by using a wax-pellet type bypass valve as the second bypass valve, depending upon the working-fluid temperature sensed by the oil-temperature sensing element built in the wax-pellet type bypass valve and the hydraulic pressure in hydraulic line 20.

As can be seen from the opening-closing characteristic diagram of first and second bypass valves 21 and 22 shown in FIG. 2, in the cooling system of each of the first and second embodiments, the valve control mode area is classified into three control mode areas A2, B2, and C2. In first control mode area A2 (see right-hand diagonal shading area of FIG. 2) that the working-fluid temperature is low whereas the line pressure is high, there is an increased tendency for a flow resistance against the working-fluid flow through water-cooled oil cooler 11 to become high. In this case, the hydraulic pressure in hydraulic line 20 tends to rise. Owing to a pressure rise, in more detail, owing to the hydraulic pressure in hydraulic line 20 exceeding the preset pressure level, first bypass valve 21 fully opens to permit the working fluid to circulate via first bypass valve 21 through lubrication circuit 16, oil pump 18, and control valve 15, bypassing both the oil coolers 11 and 12. In other words, in the first control mode area A2, the water-cooled oil cooler 11 and air-cooled oil cooler 12 are both conditioned in their inoperative states by virtue of first bypass valve 21 opened. This ensures smooth circulation of working fluid through the transmission lubrication circuit and the control valve, irrespective of a comparatively high viscous resistance of working fluid due to low working-fluid temperatures. This insures smooth shifting operation and good lubricating action in the area A2.

Regarding the control mode area B2 (see no shading area of FIG. 2), first, in a first partial portion (the upper right portion) of area B2 wherein the working-fluid temperature rises to a certain extent while the line pressure (the hydraulic pressure in hydraulic line 19) is high, second bypass valve 22 opens, since the working-fluid temperature is still below a preset temperature value. As a consequence, working fluid in hydraulic line 20 is directed through water-cooled oil cooler 11, second bypass valve 22 into automatic transmission 13 even in the presence of a high line pressure (high hydraulic pressure in line 19). Thus, the working-fluid flow through second bypass valve 22 into automatic transmission 13 occurs constantly. As a result of this, the hydraulic pressure in hydraulic line 20 is maintained at a pressure level less than the predetermined pressure level above which first bypass valve 21 opens. First bypass valve 21 is kept closed, while second bypass valve 22 is kept open. In other words, in the first partial portion of area B2 wherein the working-fluid temperature rises to a certain extent while the line pressure is high, the water-cooled oil cooler 11 is conditioned in its operative state while the air-cooled oil cooler 12 is conditioned in its inoperative state. Therefore, in the first partial portion of area B2, the working fluid flows from oil pump 18 through control valve 15, water-cooled oil cooler 11, and second bypass valve 22 to lubrication circuit 16, bypassing only the air-cooled oil cooler 12. This ensures optimal working-fluid temperature control. Second, in a second partial portion (the lower left portion) of area B2 wherein the working-fluid temperature is low and the line pressure is low, first bypass valve 21 is kept closed due to the low line pressure. On the other hand, second bypass valve 22 is kept open due to the low working-fluid temperature. In the same manner as the first partial portion of area B2, in the second partial portion of area B2, the working fluid circulates via water-cooled oil cooler 11 and second bypass valve 22 through lubrication circuit 16 and control valve 15 provided in automatic transmission 13, bypassing only the air-cooled oil cooler 12. Owing to fluid flow of working fluid flowing through only the water-cooled oil cooler 11, bypassing the air-cooled oil cooler 12, the working fluid (transmission fluid) can be warmed by engine coolant whose temperature rise rate is higher than a temperature rise rate of the working fluid during operation of the engine. This promotes a temperature rise of working fluid. In a third partial portion (the last partial portion or the lower right portion) of area B2 wherein the working-fluid temperature rises to a certain extent while the line pressure is low, owing to the working-fluid temperature less than the preset temperature value and low line pressure, first bypass valve 21 is kept closed whereas second bypass valve 22 is kept open. Thus, in the same manner as the first and second partial portions of area B2, in the third partial portion of area B2, the working fluid circulates via water-cooled oil cooler 11 and second bypass valve 22 through lubrication circuit 16 and control valve 15 provided in automatic transmission 13, bypassing only the air-cooled oil cooler 12. As set forth above, throughout the control mode area B2, the water-cooled oil cooler 11 is conditioned in its operative state while the air-cooled oil cooler 12 is conditioned in its inoperative state. In the second and third partial portions of area B2 wherein the line pressure is low and the working-fluid temperature is less than the preset temperature value, the working fluid flows through only the water-cooled oil cooler 11, bypassing the air-cooled oil cooler 12, and thus the working fluid can be effectively warmed by engine coolant. This reduces a viscosity of the working fluid, thereby ensuring an adequate working-fluid delivery rate needed for lubrication and resulting in enhanced lubricating effect and improved fuel economy.

In the control mode area C2 (see left-hand diagonal shading area of FIG. 2) that the working-fluid temperature is greater than or equal to the preset temperature value, there is an increased tendency for the flow resistance against the working-fluid flow through water-cooled oil cooler 11 to become low. In this case, the hydraulic pressure in hydraulic line 20 tends to reduce. In this case, owing to the hydraulic pressure in hydraulic line 20 less than the predetermined pressure level, first bypass valve 21 is kept closed. Additionally, owing to the working-fluid temperature lower than the preset temperature value, second bypass valve 22 is kept closed. As a consequence, the working fluid flows through both the water-cooled oil cooler 11 and air-cooled oil cooler 12, so as to effectively properly cool the working fluid. As appreciated from the operative and inoperative states of first bypass valve 21 in each of control mode areas A2, B2, and C2 of FIG. 2, the hydraulic pressure in hydraulic line 20 is affected by the working-fluid temperature as well as the line pressure (the hydraulic pressure in hydraulic line 19). In other words, opening and closing operations of first bypass valve 21 are dependent upon the working-fluid temperature as well as the line pressure, because the first bypass valve operates responsively to the hydraulic pressure in hydraulic line 20. It will be appreciated that the characteristic diagram of FIG. 2, in other words, the borderline between control mode areas A2 and B2 and the borderline between control mode areas B2 and C2 can be properly varied or determined depending on an environment in which the vehicle is actually used, for example, depending on whether the vehicle is used in a cold zone.

The entire contents of Japanese Patent Application No. P2001-067029 (filed Mar. 9, 2001) is incorporated herein by reference.

While the foregoing is a description of the preferred embodiments carried out the invention, it will be understood that the invention is not limited to the particular embodiments shown and described herein, but that various changes and modifications maybe made without departing from the scope or spirit of this invention as defined by the following claims.

What is claimed is:

1. A cooling system for working fluid used in an automatic transmission of an automotive vehicle, comprising:

a water-cooled oil cooler and an air-cooled oil cooler connected in series to each other and both disposed in an oil cooler line for cooling the working fluid;

an oil pump located in the automatic transmission and disposed in the oil cooler line for pressurizing and sending the working fluid into the oil cooler line;

a hydraulic control circuit disposed downstream of the oil pump for regulating a line pressure produced by the oil pump;

a lubrication circuit located in the automatic transmission for lubrication of moving transmission parts;

a temperature sensor that detects a working-fluid temperature;

a first bypass valve that permits the working fluid to circulate via the first bypass valve through the oil pump, the hydraulic control circuit and the lubrication circuit, bypassing the water-cooled oil cooler and the air-cooled oil cooler;

a second bypass valve that permits the working fluid to circulate via the water-cooled oil cooler and the second bypass valve through the oil pump, the hydraulic control circuit and the lubrication circuit, bypassing only the air-cooled oil cooler; and a control unit configured to be connected electronically to the temperature sensor, and the first and second bypass valves, for automatically controlling opening and closing operations of each of the first and second bypass valves depending on the line pressure as well as the working-fluid temperature and for controlling the line pressure depending on a sensor signal from the temperature sensor; the control unit comprising:

(a) a first bypass valve control section keeping the first bypass valve opened in a first control mode area that the working-fluid temperature is lower than or equal to a first predetermined temperature and the line pressure is higher than or equal to a predetermined pressure; and (b) a second bypass valve control section keeping the second bypass valve closed in a second control mode area that the working-fluid temperature is higher than a second predetermined temperature higher than the first predetermined temperature.

2. The cooling system as claimed in claim 1, wherein:

the first and second bypass valve control sections keep the first bypass valve closed and keep the second bypass valve opened in a third control mode area defined between the first and second control mode areas.

3. The cooling system as claimed in claim 2, wherein the first bypass valve is located within a control valve body included in the hydraulic control circuit.

4. A cooling system for working fluid used in an automatic transmission of an automotive vehicle, comprising:

a water-cooled oil cooler and an air-cooled oil cooler connected in series to each other and both disposed in an oil cooler line for cooling the working fluid;

an oil pump located in the automatic transmission and disposed in the oil cooler line for pressurizing and sending the working fluid into the oil cooler line;

a hydraulic control circuit disposed downstream of the oil pump for regulating a line pressure produced by the oil pump;

a lubrication circuit located in the automatic transmission for lubrication of moving transmission parts;

a temperature sensor that detects a working-fluid temperature;

a first bypass valve that permits the working fluid to circulate via the first bypass valve through the oil pump, the hydraulic control circuit and the lubrication circuit, bypassing the water-cooled oil cooler and the air-cooled oil cooler;

a control unit configured to be connected electronically to the temperature sensor and the first bypass valve, for automatically controlling opening and closing operations of the first bypass valve depending on the line pressure as well as the working-fluid temperature and for controlling the line pressure depending on a sensor signal from the temperature sensor;

the control unit comprising:

a first bypass valve control section keeping the first bypass valve opened in a first control mode area that the working-fluid temperature is lower than or equal to a first predetermined temperature and the line pressure is higher than or equal to a predetermined pressure; and the first bypass valve being located within a control valve body included in the hydraulic control circuit.

* * * * *